US008897732B2

(12) United States Patent  
Lim et al.

(10) Patent No.: US 8,897,732 B2  
(45) Date of Patent: Nov. 25, 2014

(54) BROADCAST RECEIVING APPARATUS AND BROADCAST RECEIVING METHOD

(71) Applicant: Samsung Electronics Co., Ltd., Suwon-si (KR)

(72) Inventors: Sang-min Lim, Seoul (KR); Yong-ho Choi, Suwon-si (KR); Kyoung-seok Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 13/669,619

(22) Filed: Nov. 6, 2012

(65) Prior Publication Data

US 2013/0143507 A1 Jun. 6, 2013

(30) Foreign Application Priority Data

Dec. 2, 2011 (KR) ........................ 10-2011-0128388

(51) Int. Cl.
*H04B 1/18* (2006.01)

(52) U.S. Cl.
USPC ...................................... 455/179.1; 455/296

(58) Field of Classification Search
CPC .............. H04B 1/10; H04B 1/16; H04B 1/18; H04B 1/1661; H04B 17/00; H04N 21/4263; H04N 21/4383
USPC ............ 455/63.1, 67.11, 179.1, 186.1, 226.1, 455/234.1, 254, 266, 296, 307
See application file for complete search history.

(56) References Cited

U.S. PATENT DOCUMENTS

| | | | |
|---|---|---|---|
| 2002/0055346 A1* | 5/2002 | Tsujishita et al. | ......... 455/226.1 |
| 2009/0141833 A1 | 6/2009 | Kim et al. | |
| 2009/0318104 A1* | 12/2009 | Asada et al. | .................. 455/296 |
| 2010/0112970 A1* | 5/2010 | Nakata | .......................... 455/296 |
| 2011/0075034 A1 | 3/2011 | Cowley et al. | |
| 2011/0194658 A1 | 8/2011 | Han | |
| 2011/0207426 A1* | 8/2011 | Miyagi et al. | ................. 455/296 |
| 2011/0285907 A1 | 11/2011 | Yamaguchi et al. | |

FOREIGN PATENT DOCUMENTS

KR 10-2011-0093574 A 8/2011

OTHER PUBLICATIONS

Communication dated May 23, 2014, issued by the European Patent Office in counterpart European Application No. 12191059.0.

* cited by examiner

*Primary Examiner* — Thanh Le
(74) *Attorney, Agent, or Firm* — Sughrue Mion, PLLC (57) ABSTRACT

Provided are a broadcast receiving apparatus which simultaneously receives a plurality of channels using a single tuner and tunes to a channel without affecting other channels when changing a channel, and a broadcast receiving method thereof. The broadcast receiving apparatus includes a radio frequency (RF) receiver receiving RF broadcast signals of a plurality of channels; an intermediate frequency (IF) converter converting the RF broadcast signals of the plurality of channels into IF signals, respectively; a plurality of signal processors separately processing and outputting the converted IF signals; a noise generator generating a noise signal corresponding to the IF signals; and a controller performing control to output the noise signal instead of the IF signals when at least one of the plurality of channels is changed according to user's input.

21 Claims, 7 Drawing Sheets

BROADCAST RECEIVING APPARATUS AND BROADCAST RECEIVING METHOD

CROSS-REFERENCE TO RELATED APPLICATION

This application claims priority from Korean Patent Application No. 10-2011-0128388, filed on Dec. 2, 2011 in the Korean Intellectual Property Office, the disclosure of which is incorporated herein by reference.

BACKGROUND

1. Field

Apparatuses and methods consistent with the exemplary embodiments relate to a broadcast receiving apparatus and a broadcast receiving method, and more particularly to a broadcast receiving apparatus which is capable of receiving a plurality of channels at the same time and a broadcast receiving method.

2. Description of the Related Art

A broadcast receiving apparatus, such as a TV and a set-top box, receives broadcast signals of user desired channels through a tuner and displays the received broadcast signals via a series of signal processing procedures.

To display a plurality of channels on one screen in a picture in picture (PIP) mode or to record other channels than a channel being displayed using a personal video recorder (PVR) function, the broadcast receiving apparatus needs a tuner and a demodulator which are capable of receiving a plurality of channels at the same time.

In this case, a plurality of tuners and a plurality of demodulators are generally used, wherein each of the tuners tunes a broadcast signal corresponding to each channel and the demodulators correspond to the tuners, respectively. However, when the plurality of tuners and the plurality of demodulators are used, many components are necessary and a large printed circuit board (PCB) is needed, making it difficult to manufacture a small-sized apparatus.

SUMMARY

Accordingly, one or more exemplary embodiments provide a broadcast receiving apparatus which is capable of simultaneously receiving a plurality of channels using a single tuner and a broadcast receiving method.

The foregoing and/or other aspects may be achieved by providing a broadcast receiving apparatus including: a radio frequency (RF) receiver receiving RF broadcast signals of a plurality of channels; an intermediate frequency (IF) converter converting the RF broadcast signals of the channels into IF signals, respectively; a plurality of signal processors separately processing and outputting the converted IF signals; a noise generator generating a noise signal corresponding to the IF signals; and a controller performing control to output the noise signal instead of the IF signals when at least one of the channels is changed according to user's input.

The controller may perform control to output a converted IF signal of a changed channel instead of the noise signal when an RF signal of the changed channel is received according to the user's input.

The signal processors may include a multiplexer and the IF signals and the noise signal are input to the multiplexer.

The controller may perform control to output either of the IF signals and the noise signal through the multiplexer.

The broadcast receiving apparatus may further include a demodulator demodulating the IF signals output through the signal processors.

The IF signals through the signal processors or the noise signal output may be input to the demodulator through a single line.

The IF signals output from the signal processors or the noise signal may include a set signal level.

The signal processors may further include a gain modulator modulating a gain of the IF signals such that a signal output from the signal processors has a set level.

The signal processors may further include a frequency modulator modulating a center frequency of the noise signal to correspond to the IF signals.

The foregoing and/or other aspects may be achieved by providing a broadcast receiving method including: receiving a radio frequency (RF) broadcast signals of a plurality of channels; converting the RF broadcast signals of the channels into intermediate frequency (IF) signals; processing and outputting the IF signals; changing at least one of the channels according to user's input; generating a noise signal corresponding to an IF signal of the changed channel; and outputting the noise signal instead of the IF signal.

The method may include receiving an RF signal of the changed channel according to user's input, and perform control to output an IF signal of the changed channel instead of the noise signal.

The output noise signal and the output IF signal may include a set signal level.

The method may further include demodulating the output IF signal.

According to the exemplary embodiments described above, there are provided a broadcast receiving apparatus which is capable of simultaneously receiving a plurality of channels using a single tuner and of tuning in to a channel without affecting other channels when changing a channel and a broadcast receiving method.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Figure 1:
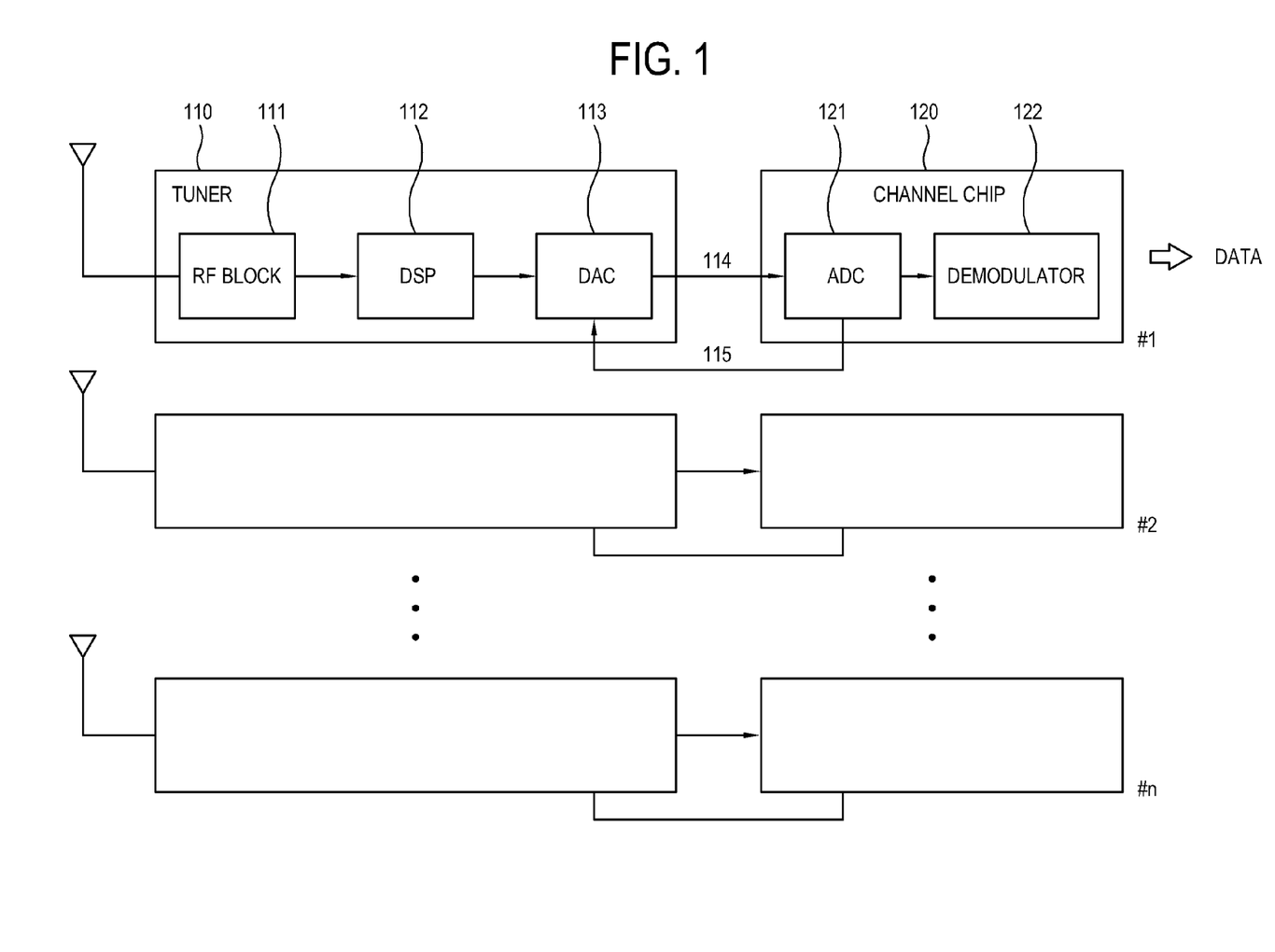
FIG. 1 is an example of a broadcast receiving apparatus receiving a plurality of channels.

FIG. 1 is an example of a broadcast receiving apparatus receiving a plurality of channels.

The broadcast receiving apparatus shown in FIG. 1 includes n tuners 110 receiving n channels and n channel chips 120 respectively corresponding to the tuners 110. When a user selects a channel, each tuner 110 receives a broadcast signal corresponding to the selected channel, and the broadcast receiving apparatus may receive broadcast signals of up to n channels at the same time.

The tuners 110 include a radio frequency (RF) block 111, a digital signal processor (DSP) 112 and a digital-to-analog converter (DAC), and each tuner 110 may receive a broadcast signal of one channel. The tuners 110 may be configured as a type of digital tuner, a silicon tuner.

The RF block 111 receives a transmitted broadcast signal in an RF band depending on a channel selected by a user, and the DSP 112 converts the received broadcast signal into an intermediate frequency (IF) signal. The DAC 113 converts the signal digitized by the DSP 112 into an analog signal and transmits the signal through a line 114 connected to an analog-to-digital converter (ADC) 121 of the channel chips 120. Further, the DAC 113 of the tuners 110 and the ADC 121 of the channel chips 120 are connected to each other through an auto gain control (AGC) line 115, thus maintaining the transmitted IF signal at a set level.

The channel chips 120 include the ADC 121 converting received signals into digital signals and a demodulator 122 demodulating transmitted modulated signals.

Transport stream (TS) data output through the demodulator 122 is output on a screen via MPEG decoding and image processing.

One set of each tuner 110 and each channel chip 120 illustrated in FIG. 1 may tune only one broadcast channel. Thus, n sets are needed to receive n channels at the same time, as shown in FIG. 1, and accordingly many components are necessary and it is difficult to manufacture a small-sized broadcast receiving apparatus.

Figure 2:
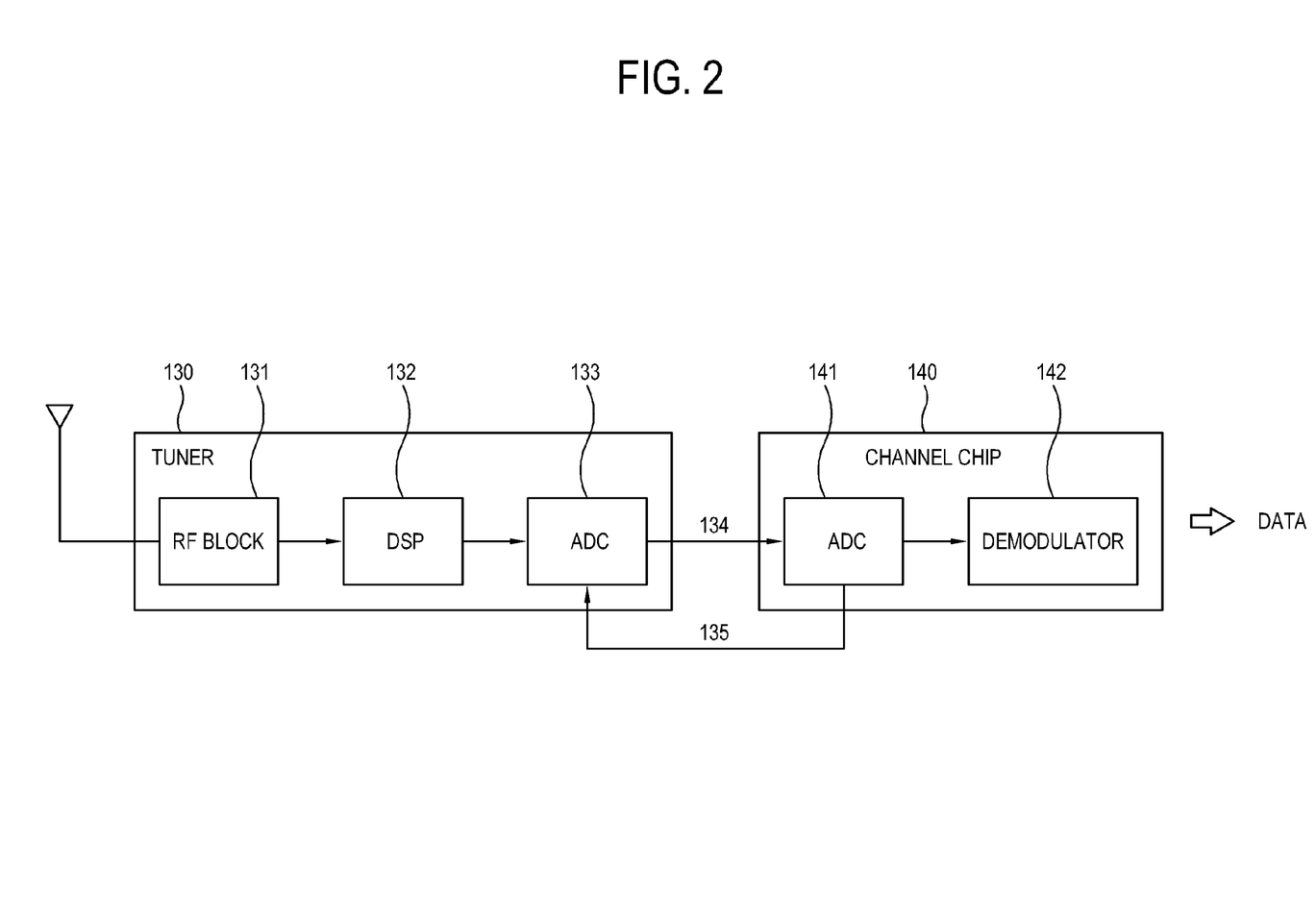
FIG. 2 is another example of a broadcast receiving apparatus receiving a plurality of channels.

FIG. 2 is another example of a broadcast receiving apparatus receiving a plurality of channels.

Unlike the broadcast receiving apparatus in FIG. 1, a broadcast receiving apparatus of FIG. 2 may receive broadcast signals of a plurality of channels only using a single tuner 130 and a single channel chip 140.

An RF block 131 receives RF signals in a wide band including a plurality of channels. For example, when a user selects channels 4, 5, and 6, the RF block 131 receives broadcast signals in frequency bands corresponding to the selected channels. The received signals are transmitted to the channel chip 140 via processing by a DSP 132 and a DAC 133 and converted by the ADC 141, and then TS data demodulated by the channels by a multi-demodulator 142 is output.

Unlike the broadcast receiving apparatus in FIG. 1, the broadcast receiving apparatus of FIG. 2 may tune a plurality of channels using a single tuner and a single channel chip. However, as shown in FIG. 3, since it is possible to receive RF signals in a wide band of only successive channels (e.g., channels 4, 5 and 6) through the RF block 131, a user may not select channels to be received simultaneously at random.

Figure 3:
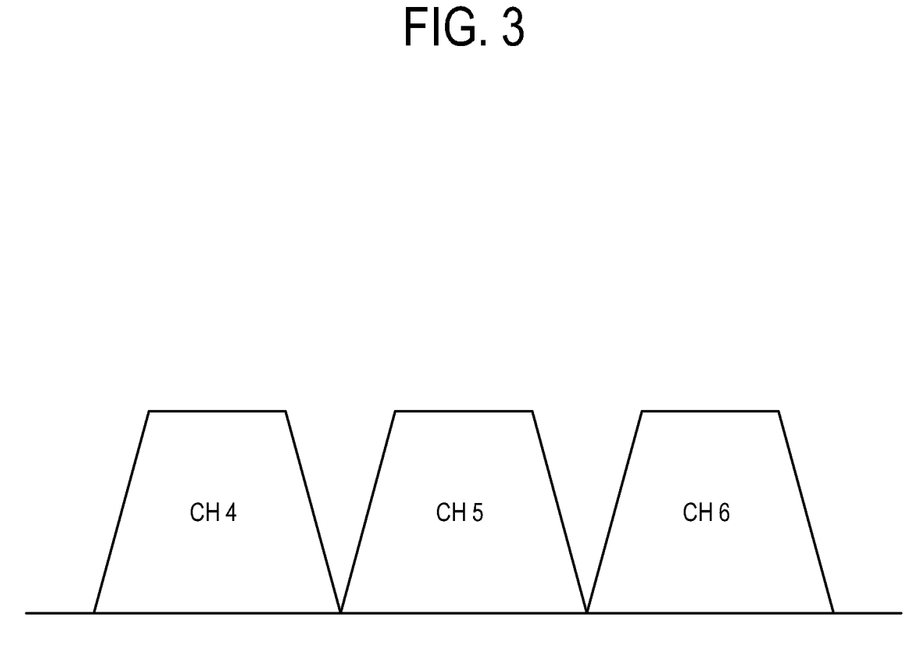
FIG. 3 illustrates broadcast signals of a plurality of channels received by the broadcast receiving apparatus of FIG. 2.

Hereinafter, a broadcast receiving apparatus which may solve the above mentioned problems of the broadcast receiving apparatuses illustrated in FIGS. 1 to 3 is described, and descriptions of equivalent/similar components are omitted herein.

Figure 4:
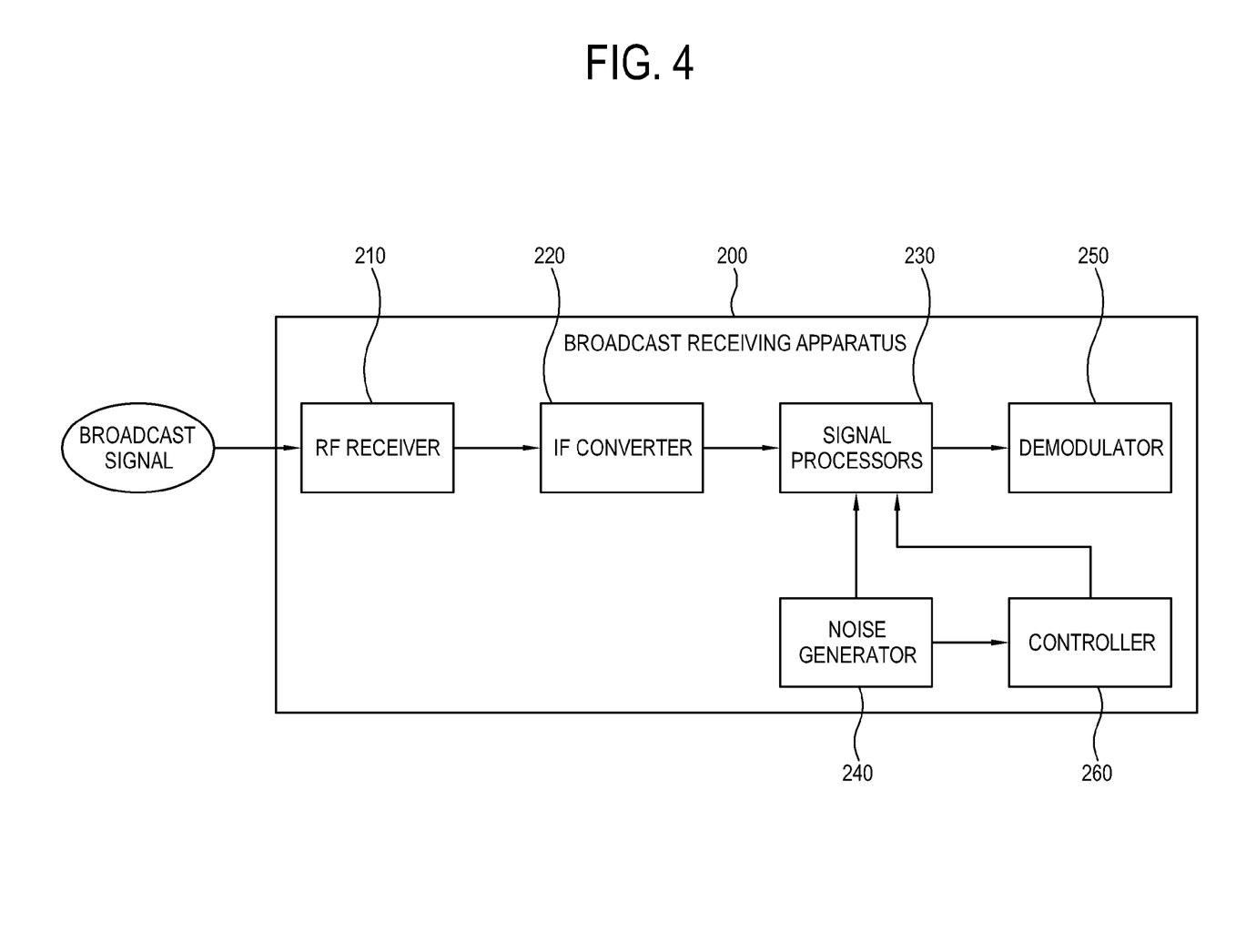
FIG. 4 is a block diagram of a broadcast receiving apparatus according to an exemplary embodiment.

FIG. 4 is a block diagram of a broadcast receiving apparatus according to an exemplary embodiment.

The broadcast receiving apparatus 200 according to the present embodiment includes an RF receiver 210, an IF converter 220, a plurality of signal processors 230, a noise generator 240, a demodulator 250 and a controller 260. The broadcast receiving apparatus 200 may be configured as a TV, a set-top box, or the like, without being limited thereto.

The RF receiver 210 receives RF broadcast signals of a plurality of channels. The RF receiver 210 receives ground-wave broadcast signals transmitted from a broadcasting station or cable-system broadcast signals in an RF band depending on a channel selected by a user through a key input unit (not shown) or a remote control (not shown). The received broadcast signals have IFs of the bandwidths corresponding to the channels. In 8-level vestigial sideband (8-VSB) and National Television System Committee (NTSC) modes, ground-wave broadcast signals have a frequency band of 44 MHz to 860 MHz, and each channel has a bandwidth of 6 MHz.

The IF converter 220 converts and outputs each of the broadcast signals of a plurality of channels received through the RF receiver 210 into an IF signal. Each RF signal of a plurality of channels selected by a user is converted into an IF signal of each channel through the IF converter 220. The IF signal has benefits in a amplifying and a frequency selection, because the IF signal has a lower frequency than the RF signal.

The signal processors 230 process and output the IF signal output from the IF converter 220. The broadcast receiving apparatus 200 according to the present embodiment includes a plurality of signal processors 230 responsible for processing an IF signal of each channel, and an IF signal output from each signal processor 230 has a set signal level. Although FIG. 4 illustrates a plurality of signal processors 230 in a single block, the signal processors 230 may be formed as separate blocks. A configuration of the signal processors 230 and a signal processing procedure thereof will be described in detail with reference to FIG. 5.

The noise generator 240 generates a noise signal corresponding to the IF signal, and outputs the signal to each of the signal processors 230 according to control by the controller 260. The generated noise signal may be output from the signal processors 230 to the demodulator 250 instead of the IF signal. Here, the output noise signal may have the same center frequency and the same band as each IF signal and also has the same signal level as each IF signal.

The controller 260 functions to control the individual components of the broadcast receiving apparatus 200 according to the present embodiment and may be configured as a microprocessor, such as MiCOM. When at least one of the channels being tuned is changed according to user's selection, the controller 260 controls the noise generator 240 to generate and output a noise signal instead of the IF signal. Then, when the changed channel is completely tuned, that is, when an RF signal of the changed channel is received by the RF receiver 210, the controller 260 controls the signal processors 230 to output an IF signal converted from the RF signal of the changed channel instead of the noise signal.

An IF signal or a noise signal output from the signal processors 230 is selectively input to the demodulator 250 through a single line. The demodulator 250 separately demodulates and outputs input signals of a plurality of channels.

Figure 5:
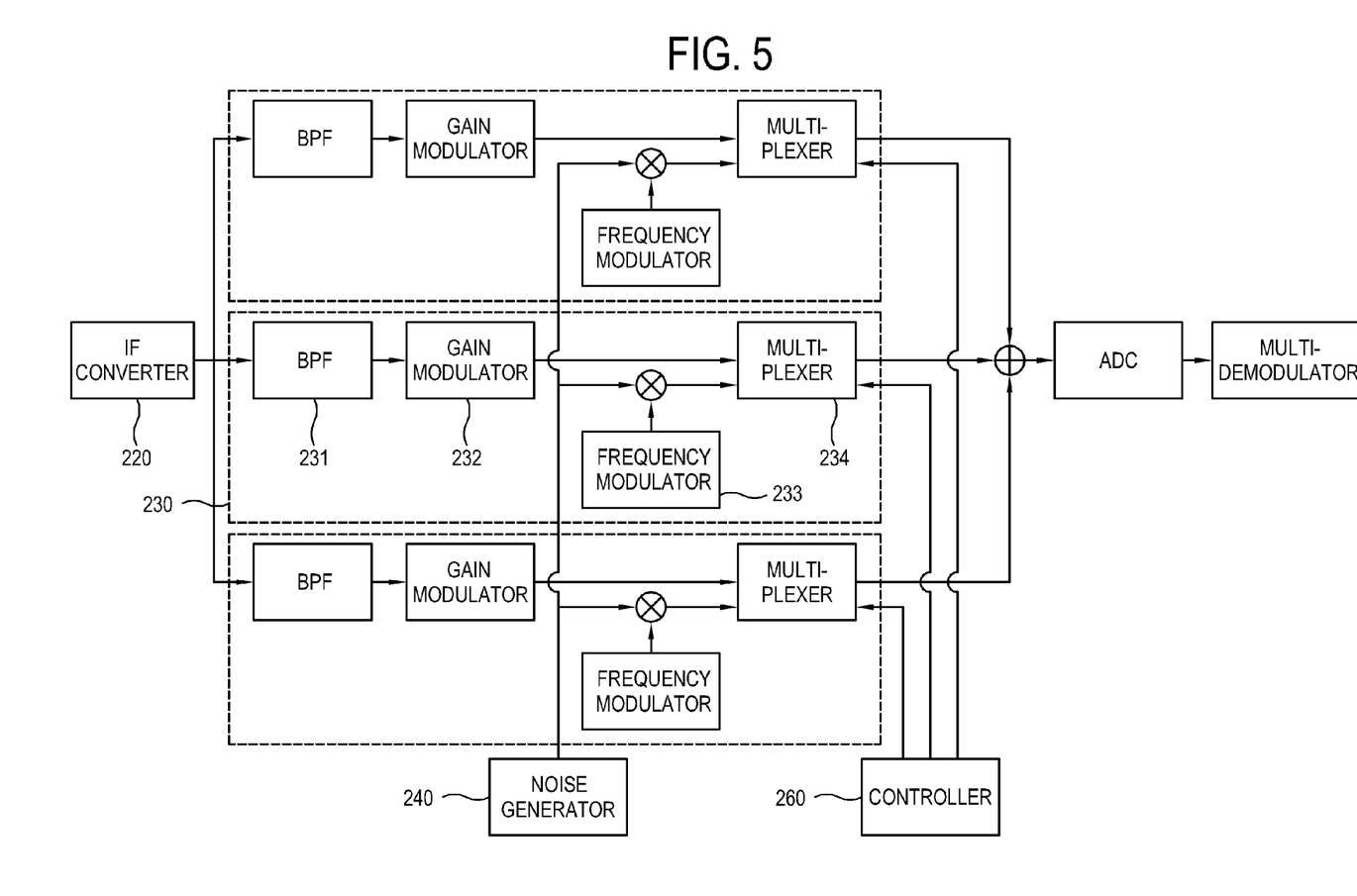
FIG. 5 illustrates a configuration of a signal processor in detail.

FIG. 5 illustrates a configuration of the signal processors in detail.

As shown in FIG. 5, the broadcast receiving apparatus 200 according to the present embodiment includes a plurality of signal processors 230. An IF signal of each channel output from the IF converter 220 is input to each signal processor 230. A maximum number of channels received at the same time is determined based on the number of signals processors 230. In the present embodiment, there are shown three signal processors 230 for convenience. Further, it is illustrated that channels 5, 10 and 20 are being received and the respective signal processors 230 process broadcast signals of channels 5, 10 and 20.

A band pass filter (BPF) 231 filters a predetermined band of an input IF signal and outputs the signal in the filtered frequency band to a gain modulator 232.

The gain modulator 232 modulates a gain of the IF signal so that the output signal has a set level when the IF signal is output to the ADC via a multiplexer 234. That is, the IF signal amplified through the gain modulator 232 is output at the set level when being output from the respective signal processor 230 corresponding to all channels. The gain modulator 232 may be configured as an auto gain control (AGC) circuit.

When a channel is changed by user's selection, for example, when a received channel changes from channel 10 to channel 15, an RF signal of channel 10 is not received by the RF receiver 210 anymore. Thus, until an RF signal of changed channel 15 is received, there is no signal input to the gain modulator 232 via the IF converter 220 and the BPF 231. The gain modulator 232 serves to amplify an output signal to have a set level. However, since there is no input signal, the gain modulator 232 is saturated in the end. As a result, the other channels being received, channels 5 and 20, are affected, as shown in FIG. 6A.

Figure 6A:
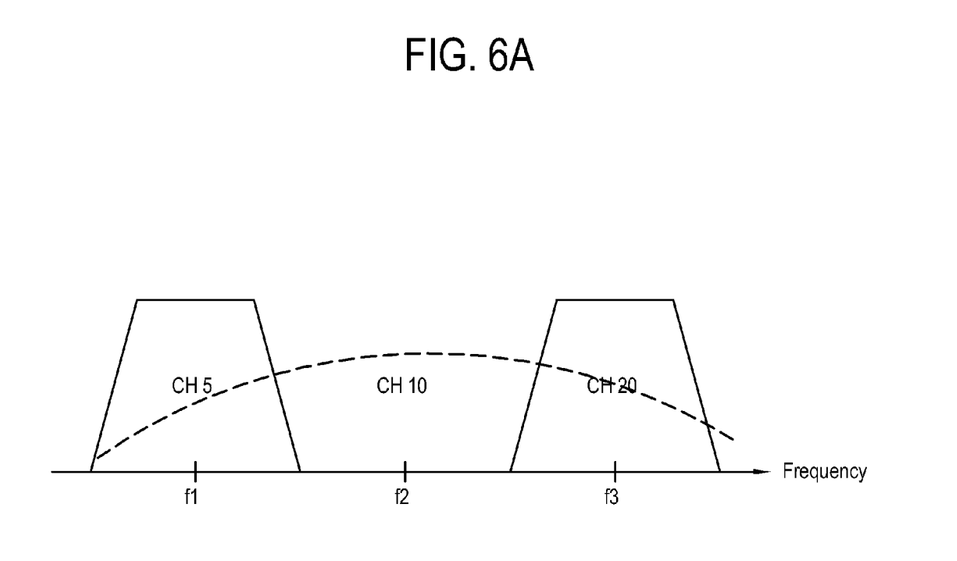
FIGS. 6A and 6B illustrate a broadcast signal generated when changing a channel.
Figure 6B:
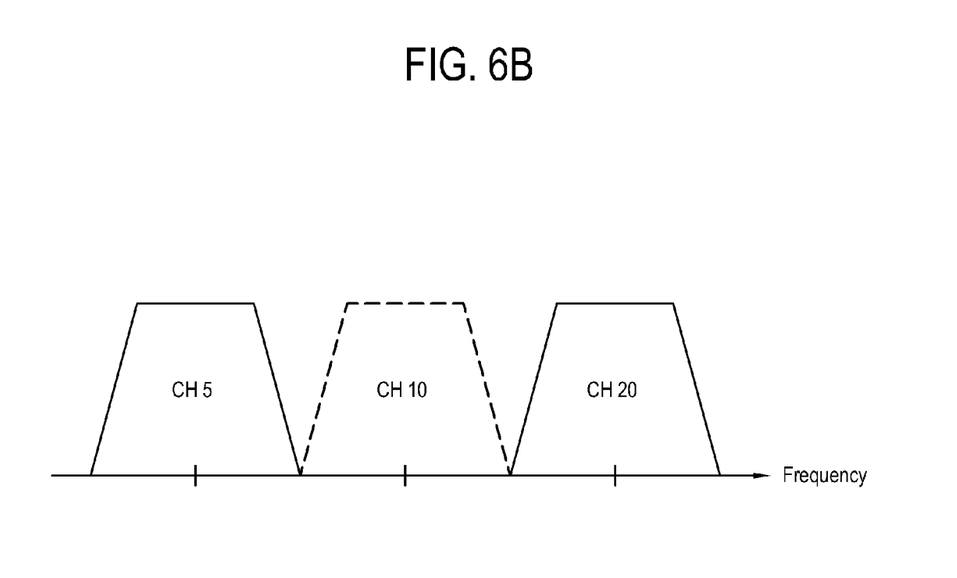

To solve this problem, the noise generator 240 generates and outputs a noise signal when a channel is changed, and a frequency modulator 233 modulates a center frequency and band of the generated noise signal to correspond to channel 10 and outputs the signal to a multiplexer 234, as shown in FIG. 6B.

The IF signal output from the gain modulator 232 and the noise signal generated by the noise generator 240 and modulated by the frequency modulator 233 each are input to the multiplexer 234. The multiplexer 234 outputs one of the IF signal and the noise signal to the demodulator 250 via the ADC according to control by the controller 260. That is, the noise signal is output when a channel is changed, and a broadcast signal of the changed channel 15 is output when the RF signal of the channel 15 starts being received.

In this manner, a noise signal replaces an IF signal immediately in tuning, so that the other channels being received, channels 5 and 20, are not affected as shown in FIGS. 6A and 6B.

As described above, the broadcast receiving apparatus 200 may receive broadcasts of a plurality of channels at the same time with a simple configuration of fewer components and tune in to a channel without affecting other channels being simultaneously received when changing a channel.

Figure 7:
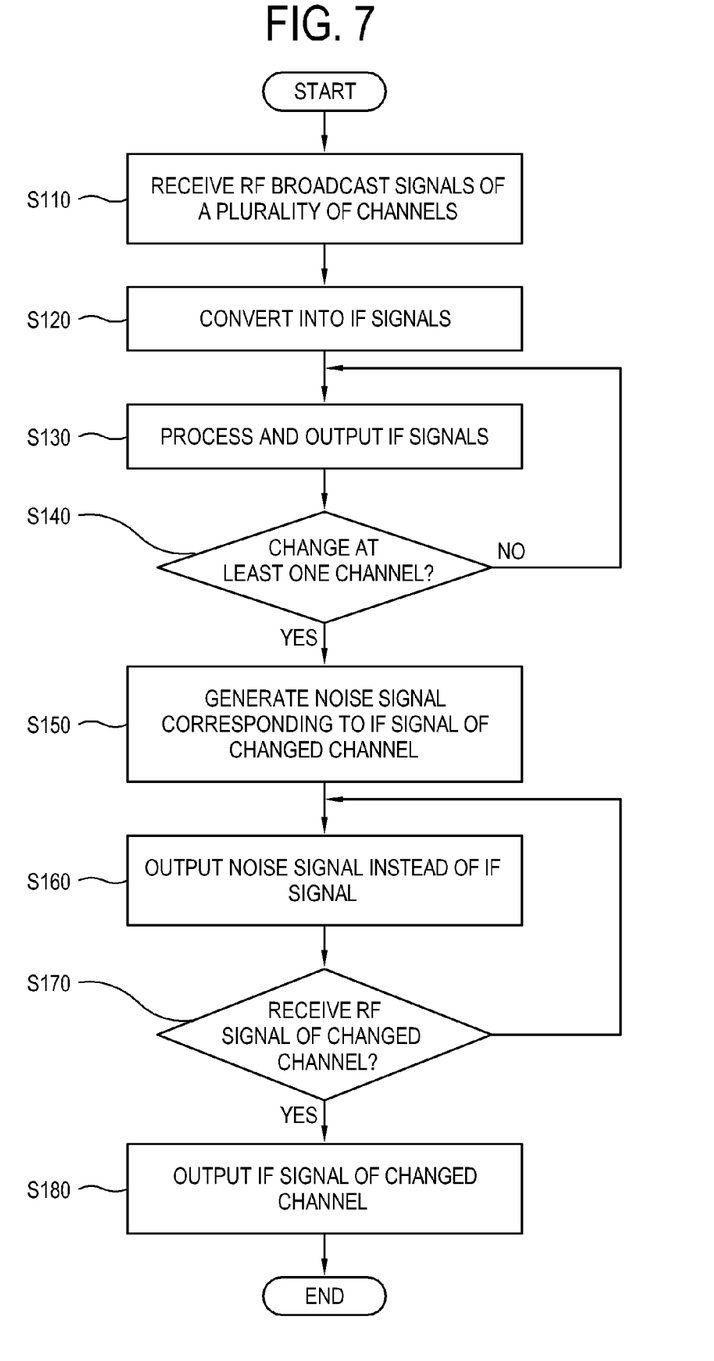
FIG. 7 is a flowchart illustrating a broadcast receiving method according to an exemplary embodiment.

FIG. 7 is a flowchart illustrating a broadcast receiving method according to an exemplary embodiment.

The broadcast receiving method according to the present embodiment may be implemented by a broadcast receiving apparatus configured as a TV, a set-top box, or the like, which includes a single tuner and a demodulator, tunes broadcast signals of a plurality of channels at the same time, and processes the broadcast signals of the individual channels.

The broadcast receiving apparatus receives RF broadcast signals of a plurality of channels (S110). The received RF signals include ground-wave broadcast signals or cable-system broadcast signals and have IFs and bandwidths corresponding to the channels.

The broadcast receiving apparatus converts the RF broadcast signals of the channels into IF signals (S120).

Next, the broadcast receiving apparatus processes and outputs the converted IF signals (S130). Signal processing at S130 includes filtering through a BPF, gain modulation through AGC, or the like, which has been described above in detail with reference to FIG. 5.

When at least one of the channels is changed by user's input (S140), the broadcast receiving apparatus generates a noise signal corresponding to an IF signal of the changed channel (S150). The generated noise signal has the same center frequency and the same band as an IF signal of each channel, and the output noise signal has the same signal level as each IF signal as well.

The broadcast receiving apparatus outputs the noise signal instead of an IF signal until receiving a broadest signal of the changed channel (S160). As a noise signal replaces an IF signal immediately in tuning, other channels being received at the same time are not affected.

When an RF signal of the changed channel is received (S170), the broadcast receiving apparatus processes a changed IF signal and then outputs the signal to a demodulator (S180). TS data demodulated by the demodulator is displayed via decoding, scaling, and the like.

As described above, the broadcast receiving method may receive broadcasts of a plurality of channels at the same time with a simple configuration of fewer components and tune in to a channel without affecting other channels being simultaneously received when changing a channel.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A broadcast receiving apparatus comprising:
   an intermediate frequency (IF) converter which converts received RF broadcast signals of a plurality of channels into IF signals, respectively;
   a signal processor which processes and outputs the converted IF signals;
   a noise generator which generates a noise signal that has a signal level corresponding to a set signal level of one of the IF signals to be converted; and
   a controller which performs control to output the generated noise signal in place of the one of the IF signals during a time period in response to at least one of the plurality of channels being changed according to user's input.

2. The broadcast receiving apparatus of claim 1, wherein the controller performs control to output a converted IF signal of a changed channel instead of the noise signal when an RF signal of the changed channel is received according to the user's input.

3. The broadcast receiving apparatus of claim 1, wherein the signal processor comprises a multiplexer and the IF signals and the noise signal are input to the multiplexer.

4. The broadcast receiving apparatus of claim 3, wherein the controller performs control to output either of the IF signals and the noise signal through the multiplexer.

5. The broadcast receiving apparatus of claim 1, further comprising a demodulator which demodulates the IF signals output through the signal processor.

6. The broadcast receiving apparatus of claim 5, wherein the IF signals, generated through the signal processor or the output noise signal, are input to the demodulator through a single line.

7. The broadcast receiving apparatus of claim 1, wherein the IF signals output from the signal processor or the noise signal comprises a set signal level.

8. The broadcast receiving apparatus of claim 7, wherein the signal processor further comprise a gain modulator which modulates a gain of the IF signals such that a signal output from the signal processor has a set level.

9. The broadcast receiving apparatus of claim 8, wherein the signal processor further comprises a frequency modulator which modulates a center frequency of the noise signal to correspond to the IF signals.

10. The broadcast receiving apparatus of claim 1, further comprising a radio frequency (RF) receiver which receives the RF broadcast signals of the plurality of channels.

11. The broadcast receiving apparatus of claim 10, wherein the RF receiver, the IF converter, the signal processor, the noise generator, and the controller are disposed in at least one of a television, a set-top box, and a personal media player.

12. A broadcast receiving method comprising:
converting received RF broadcast signals of a plurality of channels into intermediate frequency (IF) signals;
processing and outputting the IF signals;
changing at least one of the plurality of channels according to a user's input;
generating a noise signal that has a signal level corresponding to a set signal level of an IF signal of the changed channel; and
outputting the noise signal instead of the IF signal.

13. The broadcast receiving method of claim 12, further comprising receiving an RF signal of the changed channel according to the user's input and performing control to output an IF signal of the changed channel instead of the noise signal.

14. The broadcast receiving method of claim 13, wherein the output noise signal and the output IF signal comprise a set signal level.

15. The broadcast receiving method of claim 12, further comprising demodulating the output IF signal.

16. The broadcast receiving method of claim 12, further comprising displaying data output from the demodulator on a display screen.

17. An apparatus which simultaneously receives a plurality of channels, the apparatus comprising:
a radio frequency (RF) receiver which receives RF broadcast signals corresponding to the plurality of channels;
an intermediate frequency (IF) converter which converts the received RF broadcast signals corresponding to the plurality of channels into respective IF signals;
a plurality of signal processors which process and output the converted IF signals;
a noise generator which generates a noise signal that has a signal level corresponding to a set signal level of one of the respective IF signals to be converted; and
a controller which performs control of the noise generator to output the generated noise signal in place of the one of the respective IF signals during a time period in response to at least one of the plurality of channels being changed according to user's input.

18. The apparatus of claim 17, wherein each of the plurality of signal processors comprise a multiplexer and the respective IF signals and the noise signal are input to the multiplexer.

19. The apparatus of claim 17, wherein the respective IF signals output from the signal processors or the noise signal output from the noise generator comprise a set signal level.

20. The apparatus of claim 19, wherein each of the plurality of signal processors further comprise a gain modulator which modulates a gain of the respective IF signals such that a signal output from each of the plurality of signal processors has a set level.

21. The apparatus of claim 20, wherein each of the plurality of signal processors further comprise a frequency modulator which modulates a center frequency of the noise signal to correspond to the respective IF signals.

* * * * *